(12) United States Patent
Orlando et al.

(10) Patent No.: US 7,526,913 B2
(45) Date of Patent: May 5, 2009

(54) GAS TURBINE ENGINE ASSEMBLY AND METHODS OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 528 days.

(21) Appl. No.: 11/253,416

(22) Filed: Oct. 19, 2005

(65) Prior Publication Data

US 2007/0084184 A1    Apr. 19, 2007

(51) Int. Cl.
F02K 3/00 (2006.01)
(52) U.S. Cl. ............... 60/268; 60/226.1; 60/39.162; 415/9
(58) Field of Classification Search ............ 60/228, 60/226.1, 39.162; 415/9, 174.4; 416/2
See application file for complete search history.

(56) References Cited

U.S. PATENT DOCUMENTS

| | | | |
|---|---|---|---|
| 3,729,957 A * | 5/1973 | Petrie et al. | 60/226.1 |
| 3,866,415 A * | 2/1975 | Ciokajlo | 60/226.1 |
| 4,005,575 A * | 2/1977 | Scott et al. | 60/226.1 |
| 4,251,987 A * | 2/1981 | Adamson | 60/805 |
| 4,688,995 A * | 8/1987 | Wright et al. | 416/127 |
| 4,751,816 A * | 6/1988 | Perry | 60/226.1 |
| 4,827,712 A * | 5/1989 | Coplin | 60/226.1 |
| 5,010,729 A | 4/1991 | Adamson et al. | |
| 5,105,618 A * | 4/1992 | Lardellier | 60/226.1 |
| 5,806,303 A | 9/1998 | Johnson | |
| 5,809,772 A | 9/1998 | Giffin, III et al. | |
| 5,813,214 A | 9/1998 | Moniz et al. | |
| 5,867,980 A | 2/1999 | Bartos | |
| 6,158,210 A * | 12/2000 | Orlando | 60/226.1 |
| 6,381,948 B1 * | 5/2002 | Klingels | 60/226.1 |
| 6,619,030 B1 | 9/2003 | Seda et al. | |
| 6,622,473 B2 * | 9/2003 | Becquerelle et al. | 60/226.1 |
| 6,684,626 B1 | 2/2004 | Orlando et al. | |
| 6,711,887 B2 | 3/2004 | Orlando et al. | |
| 6,732,502 B2 | 5/2004 | Seda et al. | |
| 6,739,120 B2 | 5/2004 | Moniz et al. | |
| 6,763,652 B2 | 7/2004 | Baughman et al. | |
| 6,763,653 B2 | 7/2004 | Orlando et al. | |
| 6,763,654 B2 | 7/2004 | Orlando et al. | |
| 2006/0090451 A1 * | 5/2006 | Moniz et al. | 60/226.1 |
| 2007/0084184 A1 * | 4/2007 | Orlando et al. | 60/204 |
| 2007/0084185 A1 * | 4/2007 | Moniz et al. | 60/204 |
| 2007/0084186 A1 * | 4/2007 | Orlando et al. | 60/204 |
| 2007/0084187 A1 * | 4/2007 | Moniz et al. | 60/204 |
| 2007/0084188 A1 * | 4/2007 | Orlando et al. | 60/204 |
| 2007/0084189 A1 * | 4/2007 | Moniz et al. | 60/204 |
| 2007/0084190 A1 * | 4/2007 | Moniz et al. | 60/204 |
| 2007/0240399 A1 * | 10/2007 | Orlando et al. | 60/39.162 |
| 2008/0098716 A1 * | 5/2008 | Orlando et al. | 60/226.1 |

* cited by examiner

*Primary Examiner*—William H Rodriguez
(74) *Attorney, Agent, or Firm*—William Scott Andes, Esq.; Armstrong Teasdale LLP

(57) ABSTRACT

A method for assembling a gas turbine engine includes coupling a low-pressure turbine to a core turbine engine, coupling a gearbox including an input, a first output, and a second output, to the low-pressure turbine, coupling a first fan assembly to the gearbox first output, and coupling a second fan assembly to the gearbox second output.

18 Claims, 4 Drawing Sheets

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a forward fan, a core engine, and a power turbine. The core engine includes at least one compressor, a combustor, a high-pressure turbine and a low-pressure turbine coupled together in a serial flow relationship. More specifically, the compressor and high-pressure turbine are coupled through a shaft to define a high-pressure rotor assembly. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

The gas stream expands as it flows through the low-pressure turbine positioned forward of the high-pressure turbine. The low-pressure turbine includes a rotor assembly having a fan coupled to a drive shaft. The low-pressure turbine rotatably drives the fan through the drive shaft. To facilitate increasing engine efficiency, at least one known gas turbine engine includes a counter-rotating low-pressure turbine that is coupled to a counter-rotating fan and a booster compressor.

An outer rotating spool, a rotating frame, a mid-turbine frame, and two concentric shafts, are installed within the gas turbine engine to facilitate supporting the counter-rotating low-pressure turbine. The installation of the aforementioned components also enables a first fan assembly to be coupled to a first turbine and a second fan assembly to be coupled to a second turbine such that the first fan assembly and the second fan assembly each rotate in the same rotational direction as the first turbine and the second turbine, respectively. Accordingly, the overall weight, design complexity and/or manufacturing costs of such an engine are increased.

BRIEF DESCRIPTION OF THE FIGURES

In one aspect, a method for assembling a gas turbine engine is provided. The method includes coupling a low-pressure turbine to a core turbine engine, coupling a gearbox including an input, a first output, and a second output, to the low-pressure turbine, coupling a first fan assembly to the gearbox first output, and coupling a second fan assembly to the gearbox second output.

In another aspect, counter-rotating fan assembly is provided. The counter-rotating fan assembly includes a gearbox comprising an input coupled to a low-pressure turbine, a first output, and a second output, a first fan assembly coupled to the first output, and a second fan assembly coupled to the second output.

In a further aspect, a turbine engine assembly is provided. The turbine engine assembly includes a core turbine engine, a low-pressure turbine coupled to the core turbine engine, a gearbox including an input coupled to the low-pressure turbine, a first output, and a second output, and a counter-rotating fan assembly including a first fan assembly coupled to the first output, and a second fan assembly coupled to the second output.

BRIEF DESCRIPTION OF THE DRAWINGS

Figure 1:
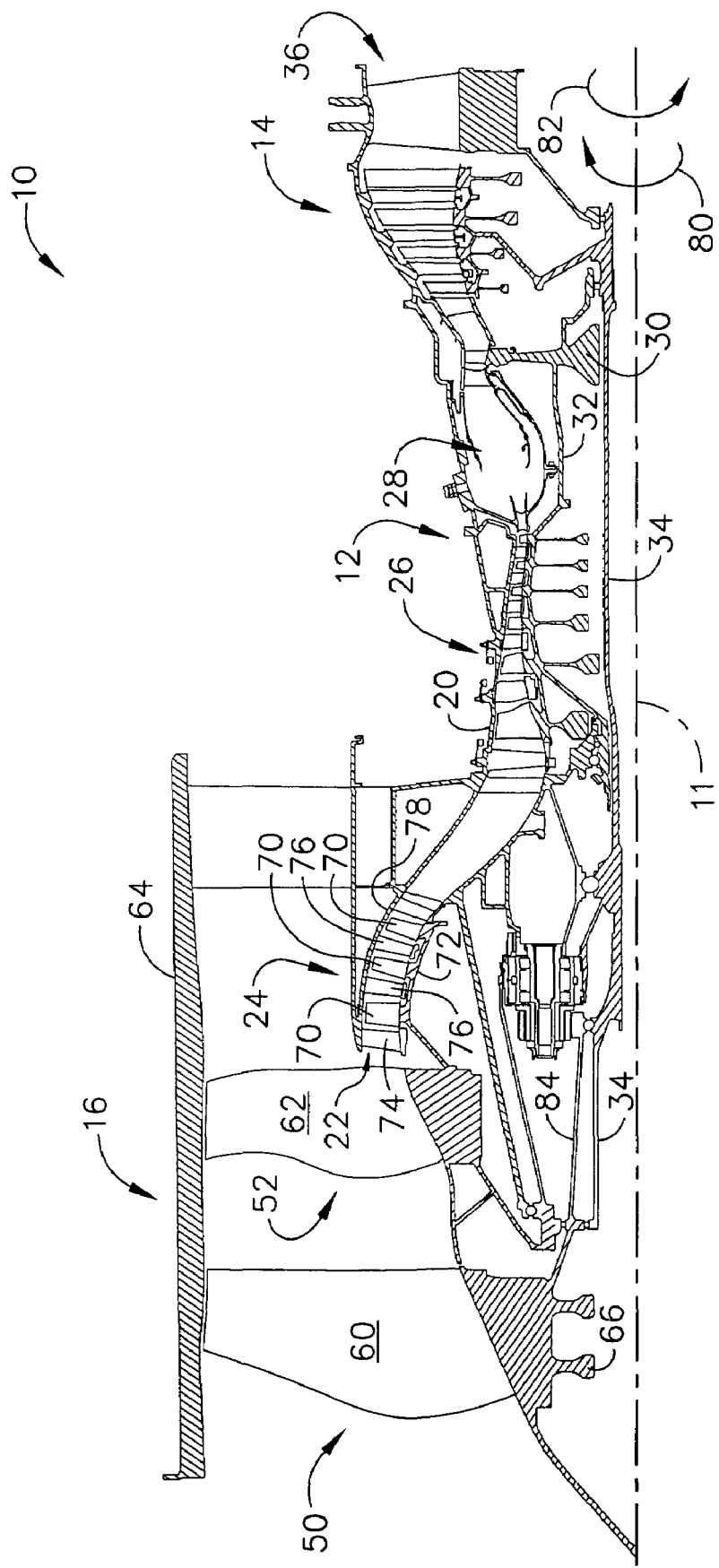
Figure 2:
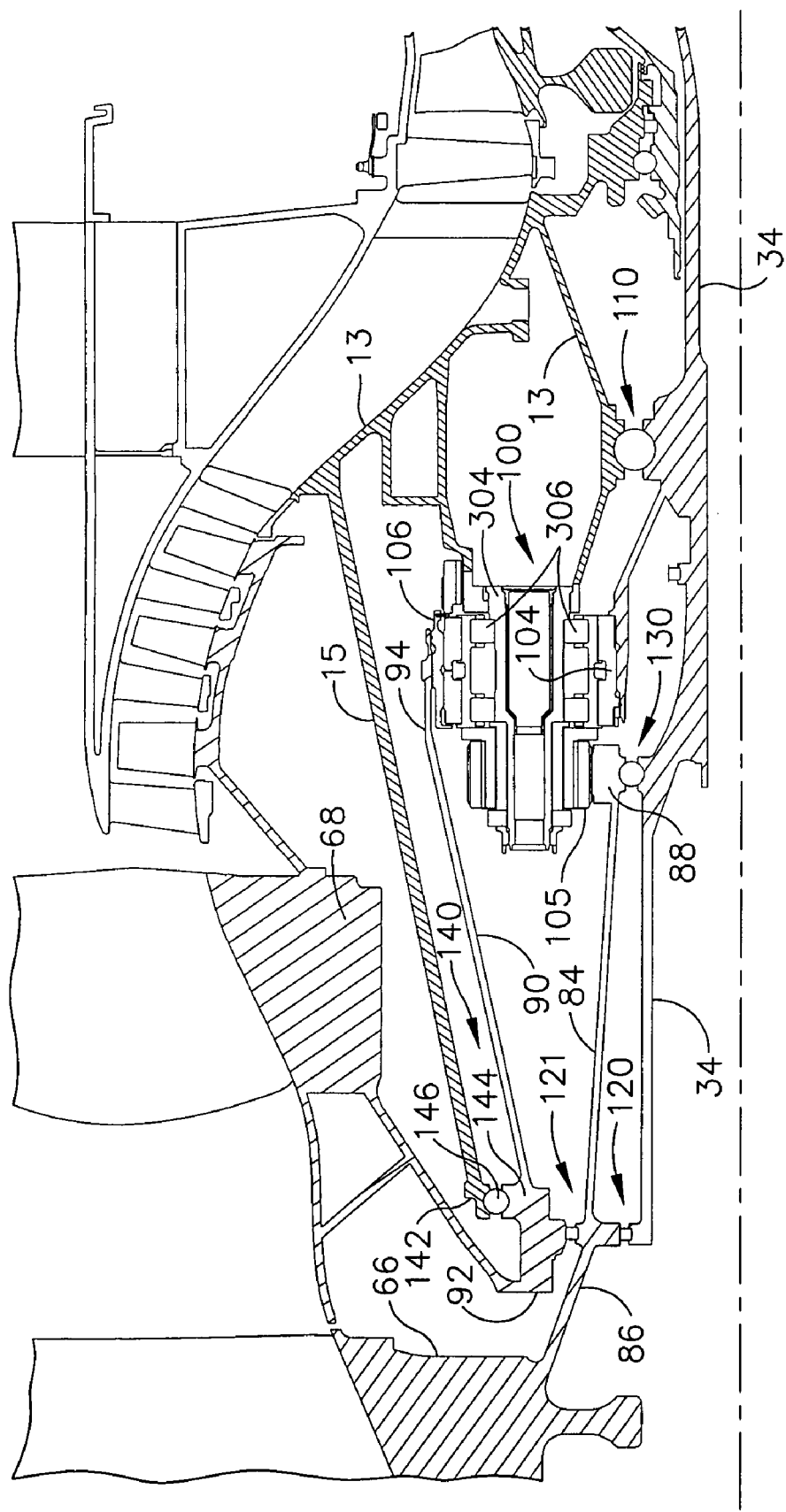
Figure 3:
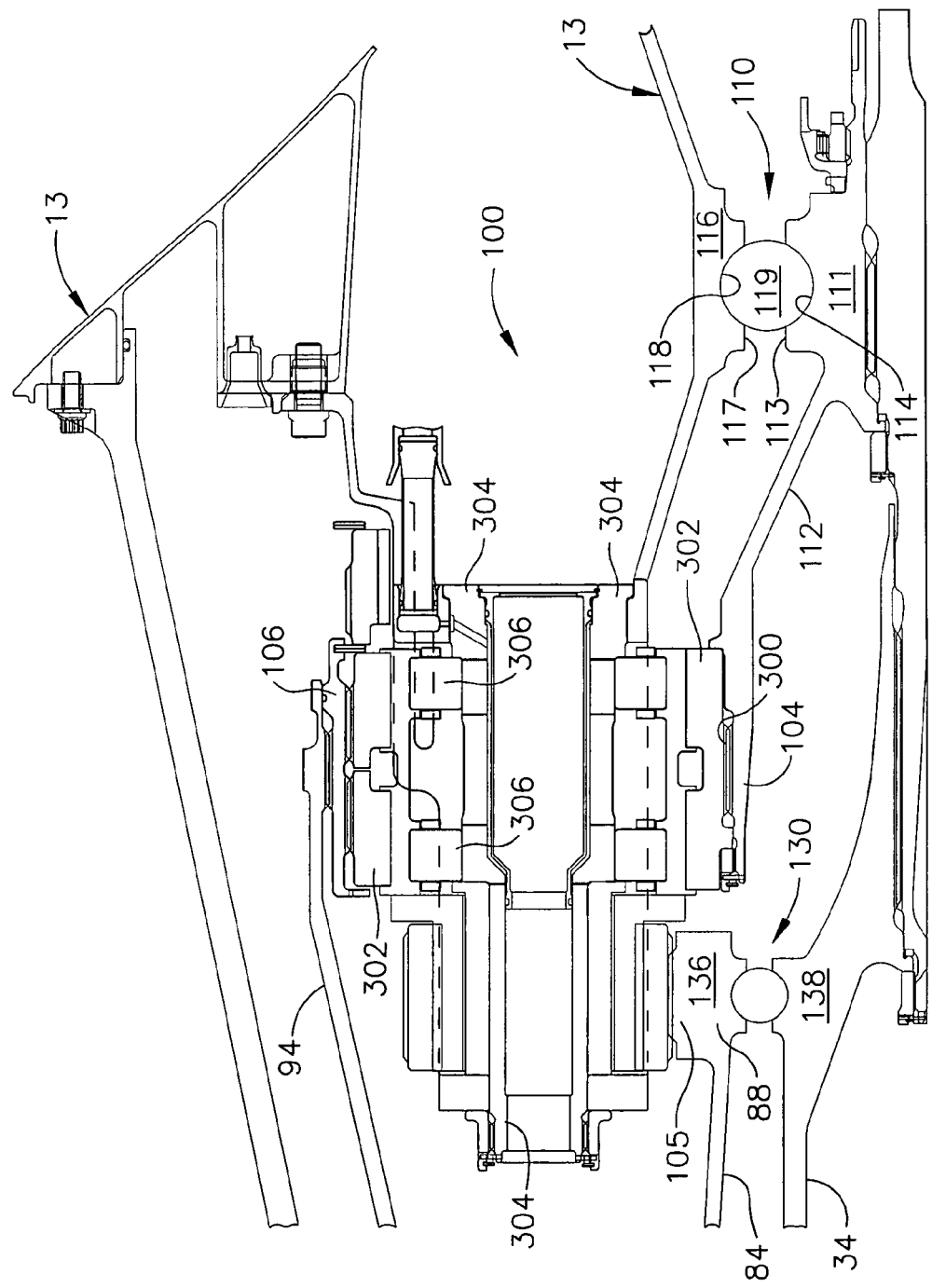
Figure 4:
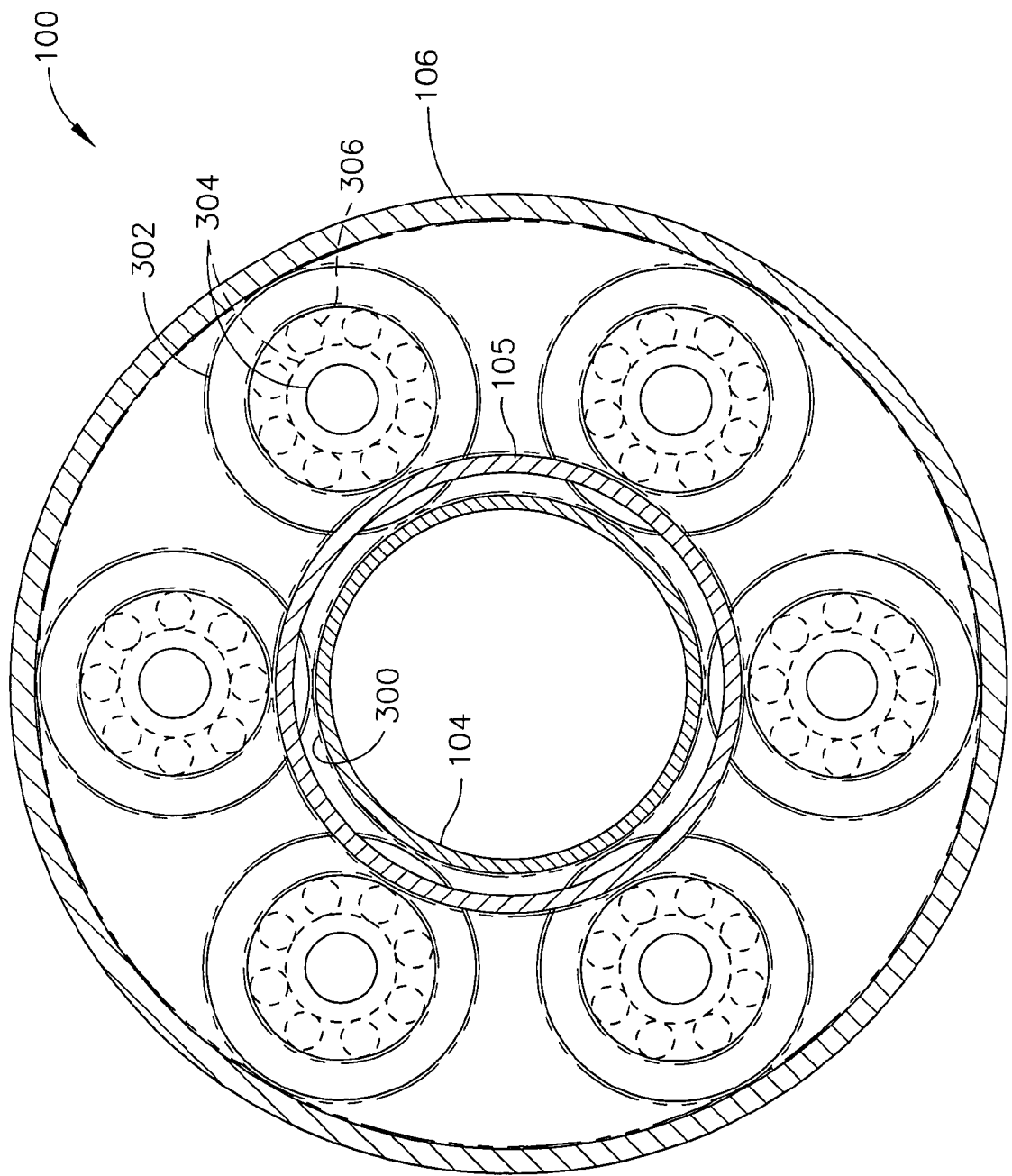

FIG. 1 is a cross-sectional view of a portion of an exemplary turbine engine assembly;

FIG. 2 is an enlarged cross-sectional view of a portion of the counter-rotating fan assembly shown in FIG. 1;

FIG. 3 is an enlarged cross-sectional view of a portion of the counter-rotating fan assembly shown in FIG. 2; and FIG. 4 is an end cross-sectional view of the gearbox shown in FIG. 3.

DETAILED DESCRIPTION OF THE INVENTION

FIG. 1 is a cross-sectional view of a portion of an exemplary turbine engine assembly 10 having a longitudinal axis 11. In the exemplary embodiment, turbine engine assembly 10 includes a core gas turbine engine 12, a low-pressure turbine 14 that is coupled axially aft of core gas turbine engine 12, and a counter-rotating fan assembly 16 that is coupled axially forward of core gas turbine engine 12.

Core gas turbine engine 12 includes an outer casing 20 that defines an annular core engine inlet 22. Casing 20 surrounds a low-pressure booster compressor 24 to facilitate increasing the pressure of the incoming air to a first pressure level. In one embodiment, gas turbine engine 12 is a core CFM56 gas turbine engine available from General Electric Aircraft Engines, Cincinnati, Ohio.

A high-pressure, multi-stage, axial-flow compressor 26 receives pressurized air from booster compressor 24 and further increases the pressure of the air to a second, higher pressure level. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first drive shaft 32, and then to second or low-pressure turbine 14 to facilitate driving counter-rotating fan assembly 16 and booster compressor 24 through a second drive shaft 34 that is coupled coaxially with first drive shaft 32. After driving low-pressure turbine 14, the combustion products leave turbine engine assembly 10 through an exhaust nozzle 36 to provide propulsive jet thrust.

Counter-rotating fan assembly 16 includes a forward fan assembly 50 and an aft fan assembly 52 disposed about longitudinal centerline axis 11. The terms "forward fan" and "aft fan" are used herein to indicate that fan assembly 50 is coupled axially upstream from fan assembly 52. In the exemplary embodiment, fan assemblies 50 and 52 are positioned at a forward end of core gas turbine engine 12 as illustrated. Optionally, fan assemblies 50 and 52 are each positioned at an aft end of core gas turbine engine 12. Fan assemblies 50 and 52 each include at least one row of rotor blades 60 and 62, respectively, and are each positioned within a nacelle 64. Blades 60 and 62 are coupled to respective rotor disks 66 and 68.

In the exemplary embodiment, booster compressor 24 includes a plurality of rows of rotor blades 70 that are coupled to a respective rotor disk 72. In the exemplary embodiment, booster compressor 24 is positioned aft of an inlet guide vane assembly 74 and is coupled to aft fan assembly 52 such that booster compressor 24 rotates at a rotational speed that is substantially equal to a rotational speed of aft fan assembly 52. Although booster compressor 24 is shown as having only three rows of rotor blades 70, it should be realized that booster compressor 24 may have a single row of rotor blades 70, or a plurality of rows of rotor blades 70 that are interdigitated with a plurality of rows of guide vanes 76.

In the exemplary embodiment, inlet guide vanes 76 are fixedly coupled to a booster case 78. In another embodiment, rotor blades 70 are rotatably coupled to rotor disk 72 such that inlet guide vanes 76 are movable during engine operation to facilitate varying a quantity of air channeled through booster compressor 24. In an alternative embodiment, turbine engine assembly 10 does not include booster compressor 24.

FIG. 2 is an enlarged cross-sectional view of a portion of the counter-rotating fan assembly 16 shown in FIG. 1. FIG. 3 is an enlarged cross-sectional view of a portion of the counter-rotating fan assembly 16 shown in FIG. 2.

In the exemplary embodiment, first fan assembly 50 includes a cone 84 positioned about longitudinal axis 11. Cone 84 is connected at a first or forward end 86 to rotor disk 66 and at a second or aft end 88 to an output of gearbox 100. Second fan assembly 52 includes a cone 90 positioned coaxially about at least a portion of cone 84 along longitudinal axis 11. Cone 90 is coupled at a first or forward end 92 to rotor disk 68 and at a second or aft end 94 to an output of gearbox 100.

Low-pressure turbine 14 is coupled to a gearbox 100 using shaft 34 to facilitate driving or rotating forward fan assembly 50, aft fan assembly 52, and booster compressor 24. In the exemplary embodiment, forward fan assembly 50 rotates in first rotational direction 80, and aft fan assembly 52 and booster compressor 24 rotate in opposite second direction 82. In the exemplary embodiment, dual-output gearbox 100 is a dual-output gearbox that includes an input 104 that is coupled to shaft 34, a first output 105 that is coupled to aft end 88 of cone 84, and a second output 106 that is coupled to aft end 94 of cone 90.

In one embodiment, a first bearing assembly, such as thrust bearing assembly 110 is positioned about drive shaft 34 and/or longitudinal axis 11. Thrust bearing assembly 110 operatively couples and/or is mounted between drive shaft 34 and frame 13 of core gas turbine engine 12. Referring further to FIG. 3, in one embodiment, thrust bearing assembly 110 includes a radially positioned inner race 111 that is mounted with respect to drive shaft 34. As shown in FIG. 3, inner race 111 is splined and/or coupled to a drive shaft extension 112 so that inner race 111 is rotatable about longitudinal axis 11 with drive shaft 34. Moreover, drive shaft extension 112 is coupled to input 104 and to drive shaft 34. Inner race 111 has a surface 113 defining an inner groove 114 of thrust bearing assembly 110. Surface 113 defining inner groove 114 has a generally arcuate profile.

Thrust bearing assembly 110 includes a radially positioned outer race 116 securely coupled to frame 13. In one embodiment, outer race 116 and/or frame 13 acts as a ground for the transfer of thrust loads and/or forces developed or generated by counter-rotating fan assembly 16 and/or booster compressor 24. Outer race 116 has a surface 117, generally opposing surface 113, which forms an outer groove 118 of thrust bearing assembly 110. Surface 117 defining inner groove 118 has a generally arcuate profile. At least one roller element, such as a plurality of bearings 119, is movably positioned between inner race 111 and outer race 116. Each bearing 119 is in rolling contact with inner groove 114 and outer groove 118 to allow drive shaft 34 to rotate freely with respect to structure 13.

A second bearing assembly, such as a roller bearing assembly 120 is positioned radially about longitudinal axis 11. In one embodiment, roller bearing assembly 120, is positioned radially inwardly of cone 84 at or near forward end 86 and radially outwardly of shaft 34. A second bearing assembly, such as a roller bearing assembly 121 is positioned radially about longitudinal axis 11. In one embodiment, roller bearing assembly 121, is positioned radially inwardly of cone 90 at or near forward end 92 and radially outwardly of cone 84. In the exemplary embodiment, bearing assemblies 120 and 121 are roller bearing that act as differential bearing assemblies in combination with thrust bearing assembly 110 to support first fan assembly 50 and/or transfer thrust loads and/or forces from first fan assembly 50 to a third bearing assembly 130.

As shown in FIG. 3, third bearing assembly 130 is a thrust bearing that includes an outer race 136 that is coupled to cone 84 aft end 88 and a radially inner race 138 that is coupled to shaft 34. In the exemplary embodiment, bearing assembly 130 acts as a ground for the transfer of thrust loads and/or forces developed or generated by first fan assembly 50.

In one embodiment, a fourth bearing assembly, such as thrust bearing assembly 140, is positioned about the outer surface of cone 90 at or near forward end 92, as shown in FIG. 2. Fourth fan bearing assembly 140 includes a radially outer bearing race 142 that is coupled to structure 13 via a support structure 15, a radially inner race 144 that is coupled to forward end 92 of cone 90, and at least one rolling element 146 that is coupled within bearing races 142 and 144. Thrust bearing assembly 140 is connected between frame 13 and forward end 92. In one embodiment, thrust bearing assembly 140 acts to support aft fan assembly 52 and/or transfer thrust loads and/or forces from aft fan assembly 52 to support structure 13. In the exemplary embodiment, bearing assemblies 110, 120, 130 and/or 140 facilitate maintaining forward fan assembly 50 and/or aft fan assembly 52 in a relatively fixed axial position and also facilitate transferring thrust loads and/or forces generated by first fan assembly 50 and/or second fan assembly 52 to ground.

FIG. 4 is an end view of gearbox 100 shown in FIG. 4. As discussed previously herein, gearbox 100 is connected to a fixed or stationary component of gas turbine engine 10, such as frame 13 of core turbine engine 12, as shown in FIG. 3. Gearbox 100 includes input 104 that is rotatably coupled to second drive shaft 34, first output 105 that is coupled to forward fan assembly 50 via cone 84, and second output 106 that is coupled to aft fan assembly 52 via cone 90.

In the exemplary embodiment, gearbox 100 includes a least one first or sun gear 300 that is coupled to input 104, and a plurality of second or planetary gears 302 that are each rotatably coupled to sun gear 300. Specifically, gearbox 100 includes sun gear 300 and a set of planetary gears 302 cooperating to produce differential speeds. Accordingly, sun gear 300 is directly coupled to shaft 32, via input 104, and planetary gears 302 are disposed to intermesh with sun gear 300 to facilitate driving aft fan assembly 52 and booster compressor 24 via output 106.

More specifically, gearbox 100 includes a unitary support structure also referred to as a gorilla cage that is configured to support sun gear 300 and planetary gears 302. In the exemplary embodiment, each planetary gear 302 is coupled to the support structure utilizing a fastener 304 such as a bolt for exampled that facilitates securing the planetary gears 302 within the support structure. Moreover, each planetary gear 302 includes a respective bearing assembly 306 such planetary gears 302 rotate freely with respect to sun gear 300.

During operation, as second drive shaft 34 rotates, second drive shaft 34 causes input 104 to rotate in first rotational direction 80, which subsequently rotates sun gear 302. Since sun gear 302 is coupled to first output 105, sun gear 302 facilitates driving forward fan assembly 50, via output 105 in the same direction as drive shaft 34. Additionally, since sun gear 302 is intermeshed with planetary gears 302, rotating sun gear 302 causes planetary gears 304 to rotate and thus drive aft fan assembly 52 via second output 106 in a second opposite direction than forward fan assembly 50.

The gas turbine engine assembly described herein includes a counter-rotating (CR) fan assembly having a geared single rotation (SR) low-pressure turbine. The assembly facilitates reducing at least some of the complexities associated with known counter-rotating low-pressure turbines. More specifically, the gas turbine engine assembly described herein includes a front fan assembly that is rotatably coupled to a single rotation low-pressure turbine through a first output from a dual-output gearbox, and an aft fan and booster assembly that are rotatably coupled together, and driven by, the low-pressure turbine via a second output from the dual-output gearbox. Moreover, the aft fan assembly and booster assembly are driven at the same speed, which, in the exemplary embodiment, is approximately one-half the front fan speed. Additionally, the gas turbine engine assembly described herein is configured such that approximately 40% of power generated by the low-pressure turbine is transmitted through the gearbox to the aft fan assembly to facilitate reducing gear losses.

As a result, the gas turbine engine assembly described herein facilitates increasing fan efficiency, reducing fan tip speed, and/or reducing noise. Moreover, since the gas turbine engine assembly described herein does not include a counter-rotating low-pressure turbine to drive the counter-rotating fan assemblies, various components such as, but not limited to, an outer rotating spool, a rotating rear frame, a second low-pressure turbine shaft, and a low-pressure turbine outer rotating seal are eliminated, thus reducing the overall weight of the gas turbine engine assembly. Moreover, in some gas turbine engine applications a mid turbine frame may be eliminated utilizing the methods and apparatuses described herein.

Exemplary embodiments of a gas turbine engine assembly that includes a gearbox coupled to a fan assembly are described above in detail. The components are not limited to the specific embodiments described herein, but rather, components of each system may be utilized independently and separately from other components described herein. The gearbox described herein can also be used in combination with other known gas turbine engines that include a forward and an aft fan assembly.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
    coupling a low-pressure turbine to a core turbine engine;
    coupling a dual-output gearbox including a single input, a first output, and a second output, to the low-pressure turbine;
    coupling a first fan assembly to the gearbox first output such that the first fan assembly and the low-pressure turbine rotate in a first direction; and
    coupling a second fan assembly to the gearbox second output such that the second fan assembly rotates in an opposite second direction.

2. A method in accordance with claim 1 further comprising coupling the low-pressure turbine to the gearbox input.

3. A method in accordance with claim 1 further comprising:
    coupling a first assembly to the gearbox first output such that the first fan assembly rotates at a first rotational speed; and
    coupling a second fan assembly to the gearbox second output such that the second fan assembly rotates at a second rotational speed that is different than the first rotational speed.

4. A method in accordance with claim 1 further comprising:
    coupling a first fan assembly to the gearbox first output such that the first fan assembly rotates at a first rotational speed; and
    coupling a second assembly to the gearbox second output such that the second fan assembly rotates at a second rotational speed that is less than the first rotational speed.

5. A method in accordance with claim 1 further comprising:
    coupling a first fan assembly to the gearbox first output such that the first fan assembly rotates at a first rotational speed that is less than a rotational speed of the low-pressure turbine; and
    coupling a second assembly to the gearbox second output such that the second fan assembly rotates at a second rotational speed that is less than the first rotational speed.

6. A method in accordance with claim 1 further comprising coupling a booster compressor to the gearbox second output such that the second fan assembly and the booster compressor each rotate in an opposite second direction.

7. A counter-rotating fan assembly comprising:
    a dual-output gearbox comprising a single input coupled to a low-pressure turbine,
    a first output, and a second output;
    a first fan assembly coupled to said first output such that said first fan assembly and said low-pressure turbine rotate in a first direction; and
    a second fan assembly coupled to said second output such that said second fan assembly rotates in an opposite second direction.

8. A counter-rotating fan assembly in accordance with claim 7 wherein said first assembly is coupled to said gearbox first output such that said first fan assembly rotates at a first rotational speed, said second fan assembly is coupled to said gearbox second output such that said second fan assembly rotates at a second rotational speed that is different than the first rotational speed.

9. A counter-rotating fan assembly in accordance with claim 7 wherein said wherein said first fan assembly is coupled to said gearbox first output such that said first fan assembly rotates at a first rotational speed, said second assembly is coupled to said gearbox second output such that said second fan assembly rotates at a second rotational speed that is less than the first rotational speed.

10. A counter-rotating fan assembly in accordance with claim 7 wherein said first fan assembly is coupled to said gearbox first output such that said first fan assembly rotates at a first rotational speed that is less than a rotational speed of the low-pressure turbine, said second assembly is coupled to said gearbox second output such that said second fan assembly rotates at a second rotational speed that is less than the first rotational speed.

11. A counter-rotating fan assembly in accordance with claim 7 further comprising a booster compressor coupled to said gearbox second output such that said second fan assembly and said booster compressor each rotate in an opposite second direction.

12. A counter-rotating fan assembly in accordance with claim 11 wherein said booster compressor is coupled to said second fan assembly such that said booster compressor and said second fan assembly each rotate at the same rotational speed.

13. A turbine engine assembly comprising:
    a core turbine engine;
    a low-pressure turbine coupled to said core turbine engine;
    a dual-output gearbox comprising a single input coupled to said low-pressure turbine, a first output, and a second output; and a counter-rotating fan assembly comprising
  a first fan assembly coupled to said first gearbox output such that said first fan assembly and said low-pressure turbine rotate in a first direction; and
  a second fan assembly coupled to said second gearbox output such that said second fan assembly rotates in an opposite second direction.

14. A turbine engine assembly in accordance with claim 13 wherein said first fan assembly is coupled to said gearbox first output such that said first fan assembly rotates at a first rotational speed, said second assembly is coupled to said gearbox second output such that said second fan assembly rotates at a second rotational speed that is less than the first rotational speed.

15. A turbine engine assembly in accordance with claim 13 wherein said first fan assembly is coupled to said gearbox first output such that said first fan assembly rotates at a first rotational speed that is less than a rotational speed of the low-pressure turbine, said second assembly is coupled to said gearbox second output such that said second fan assembly rotates at a second rotational speed that is less than the first rotational speed.

16. A turbine engine assembly in accordance with claim 13 further comprising a booster compressor coupled to said gearbox second output such that said second fan assembly and said booster compressor each rotate in an opposite second direction.

17. A turbine engine assembly in accordance with claim 16 wherein said booster compressor is coupled to said second fan assembly such that said booster compressor and said second fan assembly each rotate at the same rotational speed.

18. A turbine engine assembly in accordance with claim 13 wherein said first assembly is coupled to said gearbox first output such that said first fan assembly rotates at a first rotational speed, said second fan assembly is coupled to said gearbox second output such that said second fan assembly rotates at a second rotational speed that is different than the first rotational speed.

* * * * *